March 1, 1966     V. C. GARBARINI     3,237,378
METALLIC-BASE ADSORBENTS FOR HEATLESS DRIERS
Filed Jan. 5, 1961
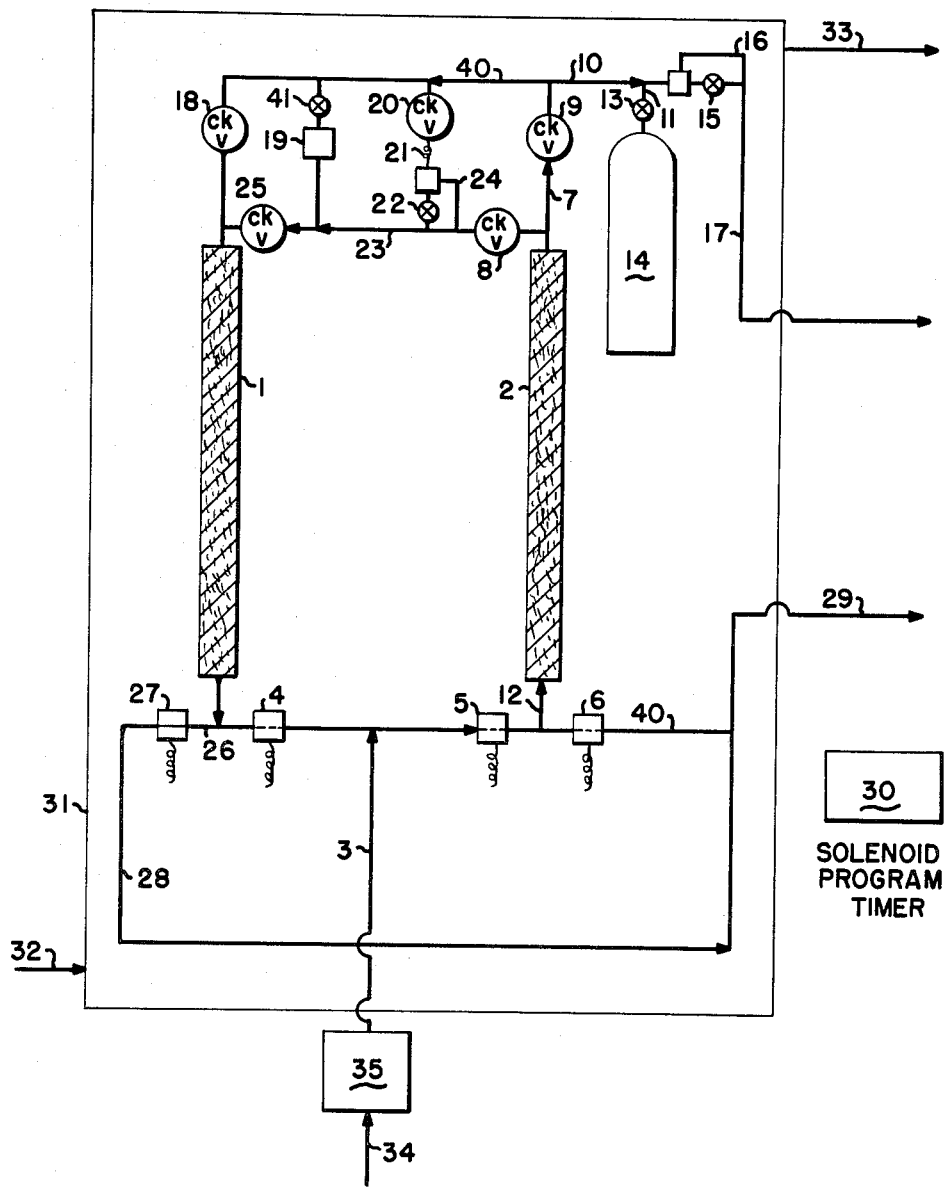
Victor C. Garbarini    Inventor
By W. O. T. Heilman
Patent Attorney United States Patent Office 3,237,378
Patented Mar. 1, 1966

3,237,378
METALLIC-BASE ADSORBENTS FOR
HEATLESS DRIERS
Victor C. Garbarini, Fords, N.J., assignor to Esso Research and Engineering Company, a corporation of Delaware
Filed Jan. 5, 1961, Ser. No. 80,851
20 Claims. (Cl. 55—33)

The present invention is concerned with an improved method for treating gaseous mixtures. The invention comprises an improvement of the pressure cycling technique described in U.S. Patent 2,944,627 issued July 12, 1960, entitled, "Method and Apparatus for Fractionating Gaseous Mixtures By Adsorption," inventor: Charles W. Skarstrom. In accordance with the present invention, metallic-base adsorbents are utilized in the heatless drier in order to secure improved results. Metal particles, foil, wire, and the like are coated with a desirable adsorbent to improve the efficiency by providing high thermal conductivity heat sink. The present invention relates to a specific improvement concerned generally with a method and apparatus for removing one or more reaction components from a gaseous mixture or gas stream containing such components.

One limitation of the heatless drier technique, as described in the above-identified patent, is reduction of adsorption efficiency as the adsorbent heats up and slow regeneration due to temperature drop caused by the desorption process. Commercial adsorbents such as desiccants ($Al_2O_3$, $SiO_2$, sova bead) have low heat capacity and thermal conductivity. Copper aluminum (and even iron) have superior thermal properties. Highly adsorbent oxide coatings can be formed on aluminum (and aluminum coated copper) by anodization and/or chemical treatment. Silicon allows (e.g.-ferrosilicon) also offer possibilities where a silica gel type adsorbent is needed. Thus, by eliminating most of the temperature drop during regeneration, the heatless drier technique can be used for drying hydrocarbon gases without excessive loss of heavy ends ($C_4$ plus). Anodized aluminum, aluminum oxide on aluminum coated copper and oxidized silicon alloys are recommended.

The present invention may be more fully understood by reference to the attached figure illustrating an embodiment of the same. The invention will be described in conjunction with a method for the recovery of hydrogen from hydrocarbon gas streams specifically and generally wherein this recovery of hydrogen is utilized in a hydroforming process in order to improve the hydroforming operation.

In essence, a specific adaptation of the present invention comprises a process wherein the tail gases recycled to the reaction zone are pressure cycled, wherein in one zone the hydrogen is purified at a relatively high pressure while the desorption zone is backwashed with a portion of the hydrogen product at a relatively low pressure.

Catalytic reforming has assumed increasing importance in petroleum refining as a result of the desire to upgrade the octane number of petroleum hydrocarbons. There are many catalytic reforming processes known in the art. Basically they may be divided into those employing a precious metal catalyst, as for example, platinum on alumina or other suitable base, or non-precious metal catalysts, such as, molybdena, cobalt-molybdena, and the like. In general, any hydrocarbon boiling in the range of about 100 to 430° F. may be reformed at a reaction temperature range of about 800 to 1000° F. The reforming process is actually a combination of several types of chemical reactions, such as, aromatization, dehydrogenation of naphthenes, isomerization, and the like.

The most desired reaction product is the $C_5+$ fraction which is readily employed as a high octane gasoline component.

More specifically, hydroforming is a process in which the normally liquid feed stock boils substantially within the range of from about 150° to 430° F. and more particularly 180° to 350° F. The light ends, i.e., the material boiling from 0° to 180° F., are not ordinarily subjected to this reaction, for the reason that the virgin naphth light ends are not appreciably upgraded by conventional reforming treatments. The feed or charging stock to the hydroforming reactor can be a virgin naphtha, a cracked naphtha, a coker naphtha, a Fischer-Tropsch naphtha, a mixture of these, or the like.

Hydroforming operations are ordinarily carried out in the presence of hydrogen or hydrogen-rich recylce gas at temperatures of 750° to 1150° F. in a pressure range of about 50 to 1000 pounds per square inch, and in contact with solid catalysts.

As mentioned, the chemical reactions involved in the hydroforming process include dehydrogenation of naphthenes to the corresponding aromatics, isormerization of straight chain paraffins to form branched chain paraffins, isormerization of cyclic compounds, such as, ethylcyclopentane, to form methylcyclohexane, and some aromatization of parafins, dealkylation and hydrocracking of paraffins. In a hydroforming operation which is conducted efficiently it is possible with the use of a proper catalyst and proper conditions of operation to hydroform a virgin naphtha to a hydroformate, for example, having Research clear octane number of from 95 to 98 and obtain yields of $C_5+$ hydrocarbons as high as 80%.

Catalysts used in hydroforming are platinum, palladium, molybdenum oxide, chromium oxide, cobalt molybdate or, in general, oxides or sulfides of metals of Groups IV–VIII of the Periodic System of elements or mixtures of these elements supported or dispersed upon a base or spacing element, such as, aluminum gel, precipitated alumina, or zinc aluminate spinel.

A particularly useful catalyst for hydroforming operations is .001–2.0 weight percent platinum upon an alumina spacing agent or base.

In hydroforming operations hydrogen containing recycle and make gas is recycled with the feed in order to minimize coke deposition and to supply heat for the hydroforming reaction. When, as is conventionally done, platinum catalyst is extensively chlorine treated during the reactivation process, chlorine is subsequently stripped off the catalyst in the hydroforming process and is recycled with the recycle gas. Or where chlorides come in with the feed, they build up on the catalyst and are subsequently stripped off the catalyst and build up in the recycle gas.

In a typical fluid hydroforming process, the hydroforming reaction is carried out in a reaction zone in the presence of hydrogen-rich recycle gas and a standard hydroforming catalyst, such as molybdenum oxide, upon an alumina support or, in general, oxides or sulfides of Group IV, V, VI, VII, and VIII of the Periodic Table based upon a suitable support.

The catalyst is maintained in the form of a fluidized bed at a temperature of 750–1150° F., e.g., 950° F., and a pressure of 150 to 600 p.s.i.g., e.g., 200 p.s.i.g. Requisite temperature level is maintained by preheating the feed, recirculating hot catalyst and employing heated recycle gas.

As is conventional in fluid hydroforming, a portion of the catalyst may be withdrawn and regenerated in a regenerator in the presence of oxygen, and returned to the reaction zone at a temperature of 1050 to 1150° F. The feed, a virgin naphtha boiling between 100 to 430° F., is introduced into the system preferably thereafter being heat exchanged with the reaction products in a heat exchanger. The preheated oil is passed to a heater 22 wherein it is vaporized, the vaporized charge being introduced into the reaction zone at a temperature of 950° F.

Concurrently, a hydrogen-rich recycle gas derived in the manner described below is heated in a heater to a temperature of about 1200° F. and injected into the reaction zone.

The feed hydrocarbons upon contact with the turbulent catalyst mass are converted principally into reaction products of essentially the same boiling point as the feed stock, together with a substantial proportion of hydrogen. The reaction products may be subjected to solid de-entrainment by means not shown prior to being withdrawn overhead. They preferably are cooled in heat exchangers by giving up their heat to the recycle gas and feed oil, respectively. The products are then passed to a scrubber wherein a relatively cool heavy oil passes countercurrently downwards to the gasiform products, condensing heavy ends which may be rejected. The scrubbing medium is preferably derived from the heavy reaction products, the heavy oil being recycled through a cooler and back to the scrubbing zone.

The uncondensed material is withdrawn, further cooled and passed into a separation drum. Sufficient cooling is effected in the cooler so that the separator normally operates at a temperature below 120° F., e.g., 105° F. at 185 p.s.i.g. The vast majority of the hydrocarbons are thus condensed. A portion thereof may be recycled to the unit while the remainder of the condensed hydrocarbon products are passed to a stabilizer after being heated to a temperature of 100 to 300° F.

The uncondensed reaction effluent, termed tail gas, is withdrawn from the separator. The tail gas comprises principally hydrogen, e.g. 72.5 volume percent, along with minor amounts of light hydrocarbons principally in the $C_1$ to $C_4$ range. The $C_1$ to $C_4$ hydrocarbons normally will comprise less than 50 volume percent of the tail gas. It is desirable to have as little as possible $C_5+$ in the recycled tail gas. The temperature of the tail gas may be about 150° F. to 250° F. or as low as 50° F.

A portion of the tail gas may be withdrawn from the system while the remainder of the tail gas is employed as recycle gas. The recycle gas fraction is passed to a compressor wherein its pressure is brought up to 50 to 100 pounds above the reaction pressure.

The bulk of the hydrocarbon products is fed to a stabilizer wherein they may be subjected to rectification to separate the various product fractions. Thus, the $C_5+$ hydrocarbon, the most valuable product, is recovered for use as high octane gasoline, while the lighter hydrocarbons are taken overhead, cooled in a cooler and separated into a $C_2$ and lighter fraction and a condensed $C_3$ to $C_4$ fraction. A portion of the condensed hydrocarbons may be recycled to the stabilizer while the $C_2$ and lighter fraction is withdrawn. The $C_3/C_4$ fraction may be partially recovered.

In accordance with the specific adaptation of the present invention the recycle tail gas is passed through a zone which in essence comprises the apparatus and method described in U.S. Patent 2,944,627 issued July 12, 1960 described above. This particular apparatus utilized will be more specifically hereinafter described. In essence, the operation comprises the preparation of a substantially pure hydrogen stream or a more rich hydrogen stream which is passed to the compressor.

Referring to the figure, the feed, which comprises a recycled tail gas comprising hydrogen, is withdrawn from the hydroforming zone 35 and is introduced into zone 2 by means of line 3. This feed passes through an open solenoid operated valve 5 and is then introduced into the bottom of zone 2 by means of line 12. Both zones 1 and 2 are packed with activated carbon. This activated carbon, in accordance with the present invention, is supported on a high heat capacity base, preferably a metallic base, thus providing a high thermal conductivity heat sink. Other satisfactory cores or supports may comprise plastics, such as vinyl compounds as, for example, polystyrene or other phenol formaldehyde plastics and urea formaldehyde plastics. A very desirable base plastic comprises Bakelite, a urea formaldehyde plastic.

Substantially pure hydrogen is removed from the top of present invention the recycle tail gas is passed through check valve 9 and can't pass through valve 8. The hydrogen then is divided. A portion of the same passes through line 10 while the remainder passes through line 40. A portion of the hydrogen passing through line 10 passes through valve 13 and is introduced into a product surge tank 14. The remainder of the hydrogen in line 10 passes through a rate of flow valve 15, the rate of which is adjusted by a flow controller 16 which maintains predetermined pressure differential across the valve. Product hydrogen is passed by means of line 17 to the reaction zone as hereinbefore described.

That portion of the hydrogen removed by means of line 40 is passed through check valve 20, through rate of flow valve 22 and then into line 23. The rate of flow through valve 22 is maintained at the desired rate by flow controller 24 which maintains the desired pressure drop across valve 22. In addition, valve 20 is spring loaded by means of spring 21 so as to only open after predetermined pressure drop occurs across valve 20.

The hydrogen removed through line 23 passes through check valve 25 and into the top of zone 1 where it backwashes downwardly through the bed. Bed 1 is maintained at a predetermined pressure below the pressure existing in adsorption zone 2. The hydrogen together with adsorbed constituents is removed from the bottom of zone 1 through line 26. This stream passes through solenoid operated valve 27 through line 28 and is withdrawn from the system by means of line 29 and further processed or handled as desired. Thus, when zone 2 is on adsorption and zone 1 on desorption valves 5, 27, 20, 22, 13, and 15 are open, whereas valves 6, 4, 18 and 41 are closed. At the end of the cycle when valve 27 closes, valve 41 opens until zone 1 reaches the predetermined high pressure. At this point valve 4 opens and valve 5 closes.

The cycle is then continued as hereinbefore described wherein zone 1 is on adsorption and zone 2 is on desorption. A portion of the product hydrogen flowing through valve 18 is used to backwash zone 2, a portion is used to repressure surge tank 14 and the remainder is passed through line 17 as product hydrogen. The hydrogen and desorbed components from zone 2 are passed through open valve 6, through line 40, and are withdrawn from the system through line 29.

In essence, the apparatus described in the figure comprises two adsorbent beds which are alternately connected to the high pressure feed. While one bed is at high pressure the other bed is dumped to the low pressure, backwashed with some of the high purity product $H_2$ through a flow control valve and brought back up to line pressure with pure $H_2$ product at the product end. Five 2-way electric solenoid valves are used. These on-off valves are operated from a multicam recycling electric timer 90 (wiring not shown). The use of the two on-off feed and two on-off dump valves allows the low pressure bed to be repressured before the other bed is dumped. This insures continuity in the product pressure and flow.

With respect to the figure, it has also been found that the repressuring downward with the pure product gas has two desirable features; namely, mechanical and process, as follows. (1) Mechanical. Inrushing gases from above tend to keep the spring loaded bed of particles well packed. This makes movement with consequent attrition of the particles negligible. (2) Process improvement. Repressuring with pure product gas instead of feed eliminates the very fast inflow of feed. When repressuring with feed, the high space velocity of the incoming gas causes the fronts of the adsorbing compounds to be moved an excessive amount toward the product end. By recharging with product from the other bed which is at high pressure, the increased feed space velocity to provide this extra demand for $H_2$ is kept at a minimum. It is further minimized by a product surge tank, hereinafter described.

As pointed out heretofore, a major limitation of the heatless drier technique is reduction of adsorption efficiency as a descicant heats up and slow regeneration due to the temperature drop caused by the dessorption process. In accordance with the present invention, a high heat capacity core in utilized as a carrier for the adsorbent. Thus, the heat capacity of the adsorbent is materially increased. Suitable adsorbents for use in conjunction with a metallic core comprise activated carbon, alumina, silica gel, glass wool, adsorbent cotton, and even soft tissue paper. Various metal oxides, clays, Fuller's earth, bone char, etc., also have adsorbent characteristics which may be utilized according to the present invention. Still another adsorbent material of the character contemplated is one known as Mobil-beads, which is a siliceous moisture adsorbing compound.

Other adsorbent materials suitable for employment according to the present invention include materials known as molecular sleeves. This class of materials includes certain zeolites, both naturally-occurring and synthetic, which have crystalline structures containing a large number of small cavities interconnected by a number of still smaller holes or pores, the latter being of exceptional uniform size. The pores may vary in diameter from 3 to 5 Angstrom units, to 12 to 15 or more. For a particular molecular sieve material, however, the pore sizes are substantially uniform and accordingly the material normally will be designated by the characteristic size of its pores.

In general, the adsorbent packing material may be any adsorbent material which has a selective affinity for one or more of the components of the gas mixture supplied to the system. These adsorbents are preferably supported on bases having a high heat capacity per unit volume. This high heat capacity per unit volume is a function of the calories per gram per degree centigrade and the specific gravity of the material. Particularly desirable materials comprise nickel, iron, and copper, while a very desirable plastic comprises Bakelite. Also, as pointed out heretofore, the present invention is particularly adapted to the heatless drying technique as described in the above-identified patent, particularly this technique when utilized in conjunction with a hydroforming operation for the production of a stream rich in hydrogen.

What is claimed is:

1. A method for fractionating a gaseous mixture comprising flowing a feed stream of said mixture at a selected initial relatively high pressure into one end and through a confined adsorption zone into contact with an adsorbent material selective for at least one component of said mixture, said adsorbent being coated on a core having a high heat capacity, progressively adsorbing said one component from said mixture stream in said zone, whereby an increasing concentration gradient of said one component on said adsorbent will advance in the direction of flow, discharging gaseous effluent stream from the other end of said zone, under substantially the initial pressure thereof, thereafter stopping the flow of said feed stream, reducing the pressure at said one end to a secondary relatively low pressure and withdrawing a gas stream from said one end, thereby progressively describing said one component from said adsorbent and backflowing said desorbed one component toward said one end, whereby a decreasing concentration of said one component on said adsorbent will advance in the direction of backflow, and discharging said one component from said zone at said one end at which said feed stream was introduced, conducting said operation for time periods so that the heats of adsorption and desorption are substantially balanced within said zone, and conducting the fractionation in a manner that substantially the sole transfer of heat to and from the gas in said zone occurs in said bed thereby eliminating the transfer of heat externally with respect to said zone, and conducting the fractionation under conditions whereby an oscillating concentration gradient of said one component will remain in said zone during both the adsorption and desorption cycle, and said gradient will have a front of lowest concentration intermediate the ends of said zone.

2. Process as defined by claim 1 wherein said core comprises a metal.

3. Process as defined by claim 2 wherein said core comprises iron.

4. A method of fractionating a gaseous mixture of at least two components consisting essentially of the steps of flowing a feed stream of said gaseous mixture comprising hydrogen and hydrocarbons at a preselected initial relatively high pressure and in an initial positive flow direction through a fixed bed of an adsorbent, said adsorbent being coated on a core having a high heat capacity, selective for at least one hydrocarbon of said mixture, for a first cycle time period less than required for said bed to come to equilibrium with said hydrocarbon, discharging the unadsorbed portion of said feed stream as a primary effluent stream comprising hydrogen; interrupting flow of said feed stream at the end of said first cycle period and reducing said initial pressure on said bed at the inlet end, desorbing said hydrocarbon from said bed at a reduced pressure, and discharging said desorbed hydrocarbon from said bed in a flow direction opposite to that of said feed stream of gaseous material, for a second cycle time period, during said second time period flowing at least a portion of said primary effluent stream through said bed in the flow direction of said desorbed hydrocarbon and discharging said portion of primary effluent portion from said bed together with said desorbed hydrocarbons as a secondary effluent stream; said time periods being each of such short duration that the heats of adsorption and desorption are substantially balanced within said bed and that substantially the sole transfer of heat to and from the gas occurs in said bed, thereby eliminating the need for the transfer of heat externally with respect to said bed; adjusting said cycle periods for a duration adapted to develop an oscillating concentration gradient of said component in said bed which remains in the bed during both the adsorption and desorption cycle, and imparting oscillatory movement to said front substantially within the limits of said bed.

5. Process as defined by claim 4 wherein said adsorbent comprises activated carbon.

6. Process as defined by claim 4 wherein said adsorbent comprises activated alumina.

7. Process as defined by claim 5 wherein said hydrocarbon comprises ethane.

8. Process as defined by claim 5 wherein said hydrocarbon comprises methane.

9. A process for the removal of a key component from a gaseous mixture stream utilizing two adsorbent beds each of which is characterized by having a one end and an other end, said process comprising the steps of flowing a feed stream of a gaseous mixture including a key component from one end to the other end through a first bed of an adsorbent initially relatively free of said key component at a preselected initial relatively high pressure and in a positive flow direction in an initial cycle, said adsorbent being preferentially selective for said key component; said adsorbent being coated on a core having a high heat capacity, discharging said gaseous mixture stream from said first bed as a primary effluent; segregating a portion of said primary effluent as a product stream and withdrawing the same; passing the remainder of said primary effluent in reverse flow from the other end to the one end through a second bed of adsorbent at a relatively low pressure, which adsorbent is relatively saturated with said key component as compared to said first bed at the start of said initial cycle, said adsorbent in said second bed being supported on a base having a high heat capacity, whereby as said initial cycle continues, said first bed becomes relatively saturated with said key component progressively from said one end toward said other end, and whereby said second bed becomes relatively freed from said key component from said other end toward said one end; continuing said initial cycle for a time period less than that required to secure saturation of said first bed at said other end and that required to secure freedom from said key component of said second bed at said one end; thereafter introducing said feed stream into said one end of said second bed in positive flow direction at said initial relatively high pressure; discharging said gaseous mixture stream from said other end of said second bed as a primary effluent; segregating a portion of said last named primary effluent as a product stream and withdrawing the same; passing the remainder of said last named primary effluent in reverse flow from said other end to said one end through said first bed of adsorbent at said relatively low pressure, and thereafter cyclically continuing the operation.

10. In the process of fractionating a gaseous mixture in order to adsorb at least one component of said mixture on an adsorbent material selective for said component, wherein said gaseous mixture is subject to adsorption at a relatively high pressure in an adsorption zone with unadsorbed components being removed therefrom, wherein said adsorption zone is reactivated by reducing its pressure and passing at least a portion of unadsorbed gaseous components through said zone in a direction opposite to the direction of gaseous feed mixture introduction thereto, and wherein said process is characterized by cyclical adsorption and adsorption zone reactivation steps in the absence of externally supplied heat, the improvement which comprises employing an adsorbent coated on a core having a high heat capacity per unit volume of core.

11. The improvement of claim 10 wherein said core is a metal of high heat capacity.

12. The improvement of claim 10 wherein said core is a plastic of high heat capacity.

13. The improvement of claim 10 wherein said core is a member of the group consisting of nickel, iron and copper.

14. The improvement of claim 10 wherein said gaseous mixture contains hydrogen which is recovered as an unadsorbed component.

15. A method according to claim 10, wherein said gaseous mixture is air and said component includes water vapor.

16. A method according to claim 10 wherein said gaseous mixture is air, and said component includes nitrogen.

17. A method according to claim 16 wherein said adsorbent is a molecular sieve material having a pore size of about 5 Angstroms.

18. A method according to claim 16 wherein said adsorbent is a molecular sieve material having a pore size of about 13 Angstroms.

19. A method according to claim 10 wherein said gaseous mixture is air and said component includes oxygen.

20. A method according to claim 19 wherein said adsorbent is a molecular sieve material having a pore size of about 4 Angstroms.

References Cited by the Examiner

UNITED STATES PATENTS

| | | | |
|---|---|---|---|
| 2,465,229 | 3/1949 | Hipple | 55—387 X |
| 2,842,223 | 7/1958 | Zall | 55—387 |
| 2,882,243 | 4/1959 | Milton. | |
| 2,944,627 | 7/1960 | Skarstrom. | |
| 2,955,673 | 10/1960 | Kennedy et al. | |
| 2,979,157 | 4/1961 | Clark | 55—387 |
| 3,015,367 | 1/1962 | Smith et al. | |
| 3,043,127 | 7/1962 | DeFord et al. | 55—67 X |

OTHER REFERENCES

"Low Dew-Point Compressed Air," by R. J. Nemmers, Compressed Air Magazine, pages 10 to 13, September 1959.

REUBEN FRIEDMAN, *Primary Examiner.*

WALTER BERLOWITZ, *Examiner.*